June 9, 1931.    T. SHIPLEY    1,808,999
REFRIGERATION
Filed Oct. 12, 1927    3 Sheets-Sheet 1
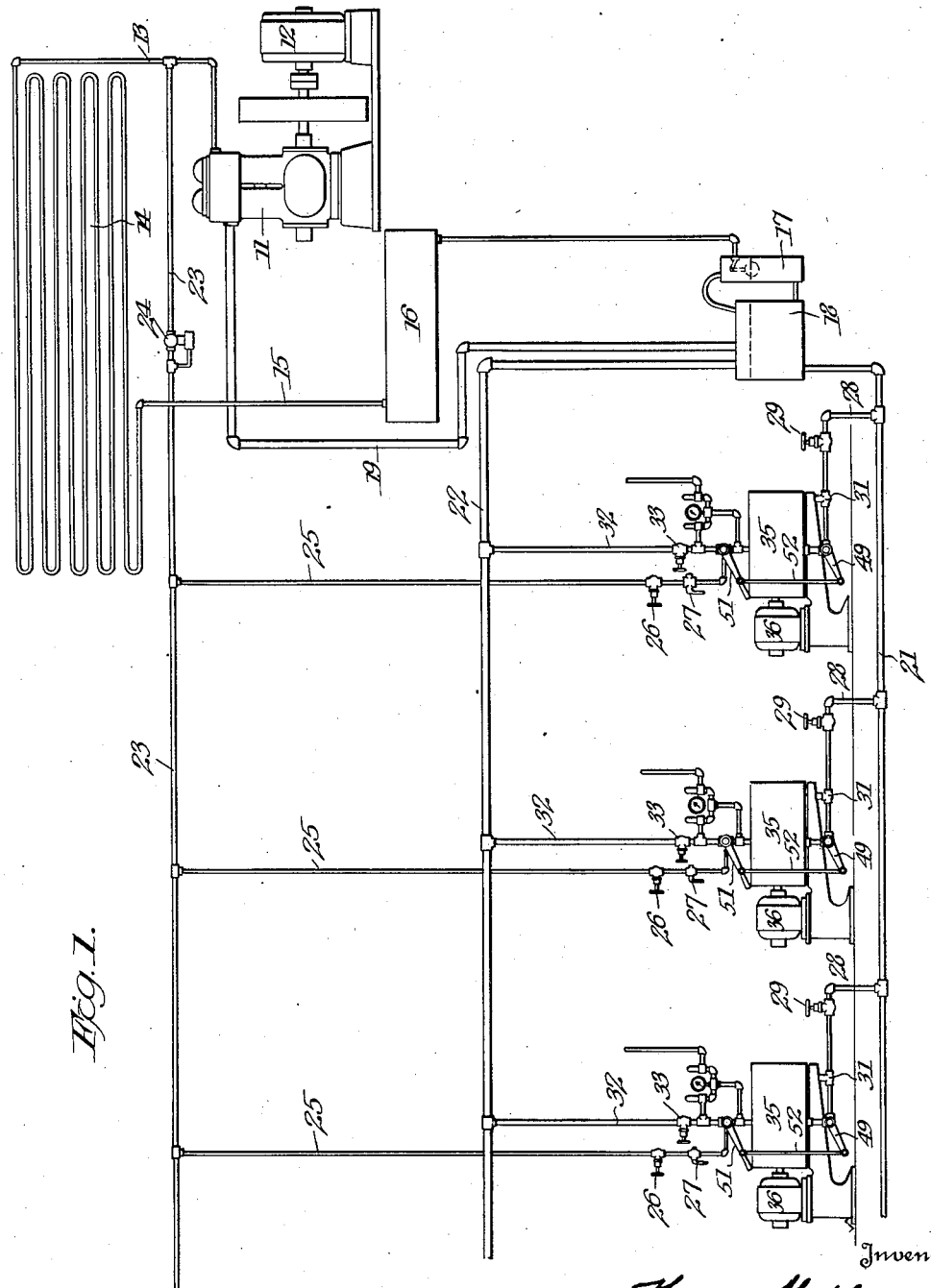

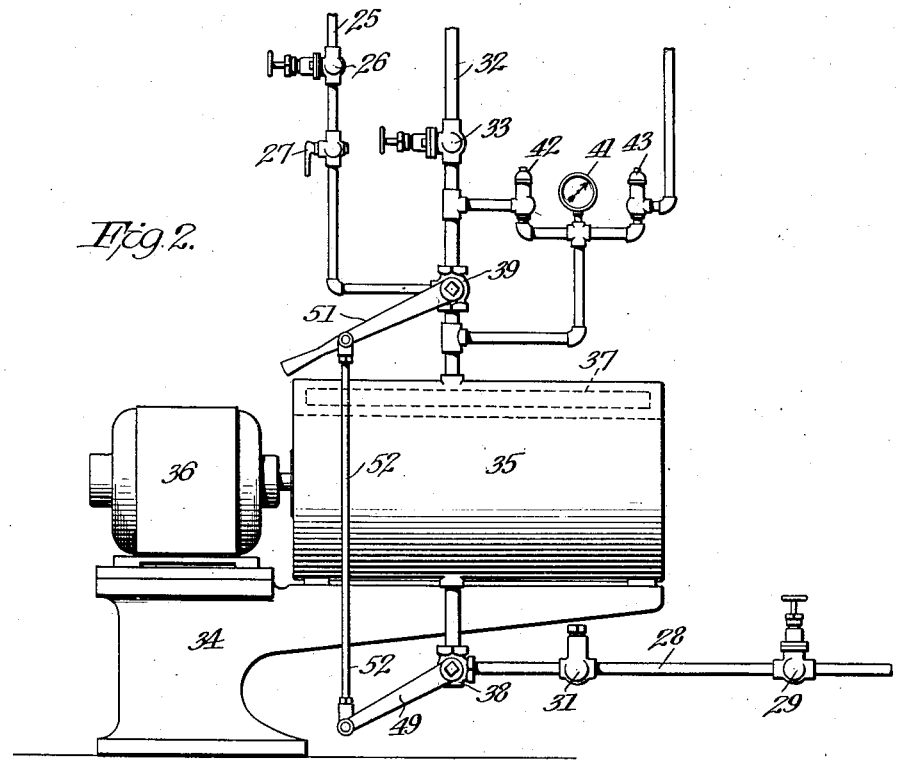
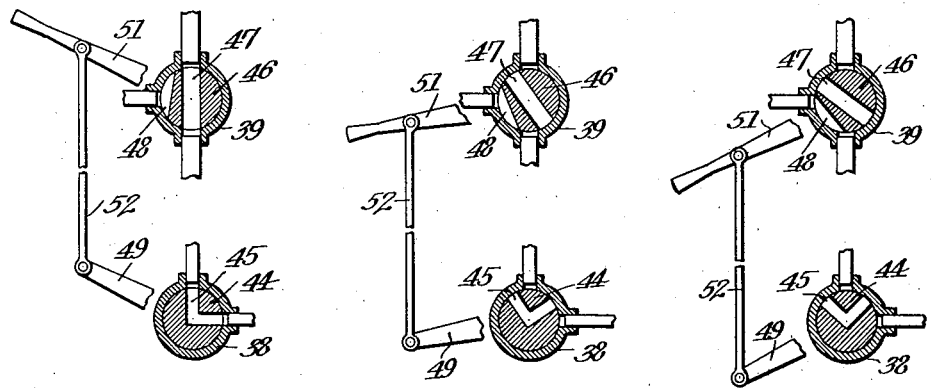

Patented June 9, 1931

1,808,999

UNITED STATES PATENT OFFICE

THOMAS SHIPLEY, OF YORK, PENNSYLVANIA, ASSIGNOR TO YORK ICE MACHINERY CORPORATION, OF YORK, PENNSYLVANIA, A CORPORATION OF DELAWARE

REFRIGERATION

Application filed October 12, 1927. Serial No. 225,774.

This invention relates to refrigeration and particularly to method of and means for changing quickly the temperature produced by an evaporative cooler of the flooded type.

While the device is available for general application, it meets a requirement peculiar to the freezing of ice cream and will be described as so applied.

In freezing ice cream the "mix" or unfrozen batch is first chilled rapidly until it approaches the freezing temperature. Then freezing is arrested and the mix is beaten to produce the so-called "swell" upon which the desired smooth texture of the finished product depends.

Heretofore brine cooled freezers have been almost universally used, because attempts to use direct expansion coolers, otherwise to be preferred, had not been successful. In prior direct expansion freezers an effort was made to control freezer temperature by controlling the suction on the evaporator. Thus to raise the temperature the suction pressure was raised through the interposition or changed adjustment of a pressure reducing valve on the suction line. This resulted in an increase of evaporator temperature but the increase was slow because it resulted only from evaporation of liquid in the evaporator with attendant heat abstraction from the mix. Thus the mix was commonly frozen before the swell could occur.

The present invention involves immediate and controlled change of evaporator pressure by the admission of hot gas from the high pressure line, at any desired reduced pressure directly to the evaporator. This produces an almost immediate change of evaporator pressure and temperature, or at any rate a much more rapid change than occurs in the devices of the prior art.

The invention lends itself to the connection of a plurality of freezers to a single receiver, and two such installations are illustrated in the accompanying drawings, in which,—

Fig. 1 is a diagrammatic elevation of the plant, three of the freezers having flooded evaporators being shown.

Fig. 2 is an enlarged elevation of one freezer and its connections.

Fig. 3 is a section showing the valves in freezing position.

Fig. 4 is a similar view showing how the refrigerant supply valve closes in advance of the suction valve, which in turn closes in advance of the opening of the hot gas port.

Fig. 5 is a similar view showing the valves in non-freezing position.

Figure 6:
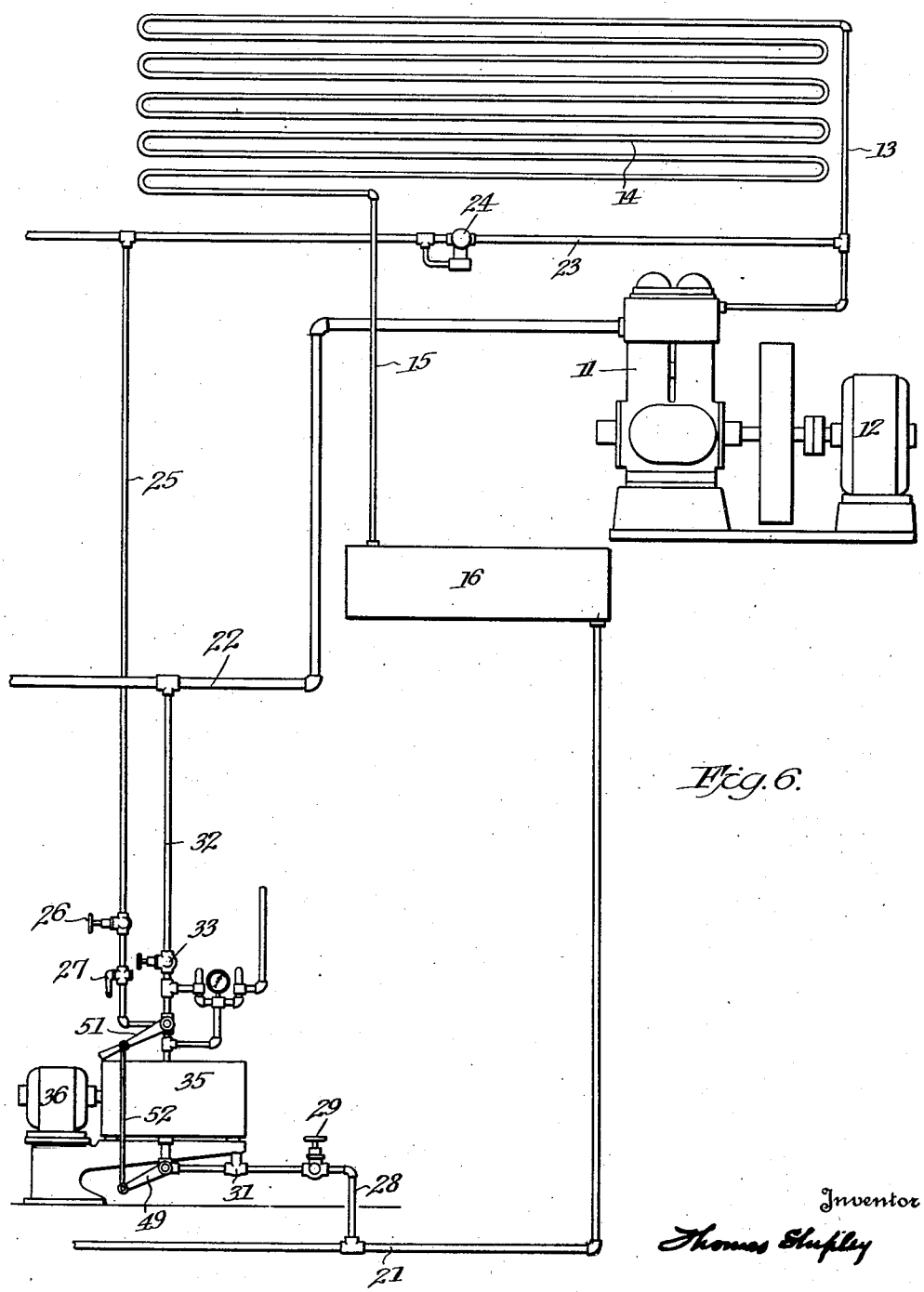
Fig. 6 is a view similar to a portion of Fig. 1 showing a modification.

Referring first to Fig. 1, the compressor is shown at 11 and its driving motor at 12. The high pressure gas line is shown at 13 and leads from the compressor to the condenser 14, which in turn delivers liquid refrigerant through liquid line 15 to high pressure receiver 16. The high pressure receiver 16 delivers liquid refrigerant through float valve 17 to low pressure receiver 18, the float valve 17 serving to maintain a constant level of liquid refrigerant in receiver 18. The suction line 19 leads from the top of receiver 18 to the suction of compressor 11.

The parts so far described conform to known practice. Part of the liquid refrigerant boils off in receiver 18 reducing the remaining liquid refrigerant to a temperature corresponding to the suction pressure.

Leading from the bottom of receiver 18 is low pressure liquid line 21, while a suction line 22 is connected to the top of receiver 18.

Leading from the high pressure gas line 13 is the hot gas bleed line 23 in which is interposed a pressure reducing valve 24. This valve is of a known type responding to pressure on its discharge side and operating to maintain this reduced pressure constant. The valve 24 is preferably adjustable to vary the reduced pressure established by its action.

Leading from bleed line 23 beyond reducing valve 24 are branches 25, three being shown, one for each freezer illustrated. In each branch is a stop valve 26 and a quick closing stop cock 27. Similarly there are branches 28, one for each freezer, leading from liquid line 21 and each provided with a stop valve 29 and a check valve 31. There are also branches 32, one for each freezer, each connected to suction line 22, and each controlled by a stop cock 33.

The parts now to be described are shown on a larger scale in Fig. 2.

An ice cream freezer of known construction includes a base 34, a hollow walled cylindrical freezer drum indicated at 35 and a motor 36 which drives a dasher or beater (not shown) within the cylindrical drum. It is unnecessary to discuss the details of the freezer, the only part here involved being the annular chamber 37 within the hollow walls of the drum which serves as an evaporator and completely surrounds the interior cream receiving space of the drum. The level of refrigerant maintained in receiver 18 is at or near the top of the chambers so that the receiver when connected to the chamber, maintains these substantially full of liquid refrigerant. Evaporation of this refrigerant abstracts heat from the mix within the drum and produces the desired refrigerative action.

Liquid line branch 28 brings refrigerant through valve 29 and check valve 31 to liquid supply valve 38, which is illustrated in Figs. 3, 4 and 5 as a plug cock, but may take other forms. This cock controls the flow of liquid refrigerant to chamber 37.

From the top of chamber 37 there is a connection to the multiple valve 39 which has connections to suction branch 32 and hot gas branch 25 as shown. There is also a connection from chamber 37 (not controlled by valve 39) to a gage 41 and two relief valves 42 and 43. Valve 42 is adjustable and discharges into suction branch 32. It is set for a relatively low pressure corresponding to the temperature which it is desired to maintain during the beating or swell period. Valve 43 is set for a higher pressure, may or may not be adjustable, and may discharge to atmosphere. This is merely a safety valve intended to relieve chamber 37 should the operator attempt to scald the freezer while chamber 37 is not otherwise vented.

The valves 38 and 39 will now be described with reference to Figs. 3, 4 and 5. The valve 38 has a rotary plug 44 having port 45 which in one position connects branch 28 with chamber 37. The valve 39 has a rotary plug 46 having ports 47 and 48 which function in alternation. In one position port 47 connects chamber 37 with branch 32. In another position port 48 connects chamber 37 with branch 25.

Plug 44 is actuated by lever 49 and plug 46 by hand-lever 51. These levers are connected to maintain parallelism by link 52.

In the position of Fig. 3 chamber 37 is connected to branches 28 and 32. This is the normal freezing position. As the plugs are turned counter-clockwise the connections with branches 28 and 32 are interrupted successively in the order named (see Fig. 4). At the limit of motion (Fig. 5) chamber 37 is connected by port 48 with branch 25 after the closing of the connection to branch 32.

In the operation of the system the motor 36 drives the dasher continuously. After the batch is charged into a freezer, the initial chilling is carried out with the valves in the position of Fig. 3. When the temperature of the batch has been reduced to the point at which the swell commences, the lever 51 is moved downward shifting the valves to the position of Fig. 5.

This closes the suction and liquid supply connections and admits gaseous refrigerant under reduced pressure to the evaporator raising the evaporator pressure and terminating evaporation therein. The refrigerative effect is thus quickly arrested assuring the desired swell.

It should be observed that the pressure in the freezer will be indicated by the gage 41 and that the pressure during the swell period (valves in position of Fig. 5) is controlled by and may be varied by changing the setting of reducing valve 24 and relief valve 42. A convenient adjustment is to set valve 24 to establish a reduced pressure equivalent to the highest pressure ever to be used in evaporator chambers 37.

The valves 42 will each be set for the pressure desired in the evaporator, usually a lower pressure than that established by valve 24. It follows that there will then be a moderate flow of gaseous refrigerant to and through the evaporator from which it discharges through valve 42 to branch 32. This allows the temperature of each evaporator to be set independently of the others by adjustment of its valve 42.

In Fig. 6 is illustrated an alternate construction in which refrigerant is fed to the evaporators through expansion valves and the low pressure receiver and float feed thereto are eliminated. In such case the suction line 22 leads directly to the suction of the compressor and the high pressure receiver 16 is connected directly to the liquid line 21, the valves 29 then becoming expansion valves and the jackets 37 become expanders rather than flooded evaporators.

Except that this system requires the adjustment of the expansion valves 29, the operation is essentially the same as that already described in connection with the flooded system, and in such a system the admission of high pressure gas will operate to establish a definite new temperature in the freezer even more quickly than is the case in the flooded evaporator, for the reason that the volume of low temperature liquid refrigerant present in the evaporator is obviously less.

While the invention has peculiar utility when used in direct expansion ice cream freezers, it is not restricted to that field. Changes of detail, which will readily suggest themselves, may be desirable when applying the invention to other special fields, nor is it essential that the structures illustrated be exactly followed in any installation.

What is claimed is:—

1. The method of arresting the refrigerative action of an evaporator containing at least a small quantity of volatile refrigerant in the liquid state, which consists in isolating the evaporator and admitting thereto gaseous refrigerant at a controlled pressure higher than that corresponding to the temperature of the liquid refrigerant in the evaporator.

2. The method of arresting the refrigerative action of a flooded evaporator, which consists in artificially establishing in said evaporator a pressure higher than that corresponding to the temperature of the liquid refrigerant, and maintaining said pressure while retaining the liquid refrigerant in the evaporator.

3. The method of arresting the refrigerative action of a flooded evaporator, which consists in closing the evaporator, admitting gaseous refrigerant to said evaporator at a pressure higher than that corresponding to the temperature of the liquid refrigerant, and continuing to supply gaseous refrigerant under said high pressure to compensate for condensation and maintain said higher pressure.

4. The method of arresting the refrigerative effect of a flooded evaporator, which consists in closing off the evaporator, admitting to the evaporator hot gaseous refrigerant at a pressure materially higher than that corresponding to the temperature of the liquid refrigerant; and continuing to supply such gaseous refrigerant at a substantially constant pressure until the liquid in said evaporator reaches the temperature corresponding to such higher pressure; and thereafter relieving excess pressure.

5. The method of freezing ice-cream and the like, in a freezer having a direct expansion evaporator, which consists in operating the evaporator under reduced pressure to effect refrigeration until the batch being frozen starts to swell, then isolating said evaporator and admitting gaseous refrigerant thereto at a controlled higher pressure and beating the batch undergoing freezing in the freezer while maintaining said higher pressure in the evaporator.

6. The method of freezing ice-cream and the like, in freezers having direct expansion coolers of the flooded evaporator type, which consists in operating the evaporator under reduced pressure to produce a refrigerative effect until the batch being frozen starts to swell; then closing off said evaporator to retain therein liquid refrigerant; admitting hot gaseous refrigerant to said evaporator at a pressure in excess of that corresponding to the temperature of the liquid refrigerant in said evaporator; and beating the batch undergoing freezing in the freezer while maintaining said high pressure in the evaporator.

7. The combination of an evaporator having a liquid refrigerant supply connection, a suction connection and a high pressure gas connection; valve means controlling said connections; and means for assuring the opening and closing of said connections by said valve means in a definite sequence.

8. The combination of an evaporator having a liquid refrigerant supply connection, a suction connection and a high pressure gas connection; valve means controlling said connections; means for assuring the opening and closing of said connections by said valve means in a definite sequence; and means for limiting the pressure established in said evaporator.

9. The combination of an evaporator having a liquid refrigerant supply connection, a suction connection and a high pressure gas connection; valve means controlling said connections; and a single actuating device for said valve means, the valve means being so arranged that outflow of liquid refrigerant through the supply connection is precluded when the high pressure gas connection is open.

10. The combination of an evaporator having a liquid refrigerant supply connection, a suction connection and a high pressure gas connection; valve means controlling said connections; and a single actuating device for said valve means adapted to open and to close said valve means in relatively reverse sequences.

11. The combination of an evaporator having a liquid refrigerant supply connection, a suction connection and a high pressure gas connection; valve means controlling said connections; and a single actuating device for said valve means arranged to open the high pressure gas connection only when said other connections are closed.

12. The combination of a flooded evaporator having a liquid refrigerant supply connection, a suction connection and a hot gas connection; valve means controlling said connections; and means for preventing the opening of said hot gas connection except when said other connections are closed.

13. The combination of a flooded evaporator having a liquid refrigerant supply connection, a suction connection and a hot gas connection; valve means controlling said connections; means for preventing the opening of said hot gas connection except when said other connections are closed; and means for limiting the pressure established in said evaporator when said hot gas connection is open.

14. The combination of an evaporator having a liquid refrigerant supply connection, a suction connection and a high pressure gas connection; a check valve in said supply connection permitting flow only toward the evaporator; and valve means controlling the suction and high pressure gas connections conjointly, and operable to open either while maintaining the other closed.

15. The combination of an evaporator having a liquid refrigerant supply connection, a suction connection and a high pressure gas connection; valve means controlling said connections; and a single actuating device for said valve means arranged to close first the supply then the suction and finally open the high pressure gas connection when moved in one direction, and when moved in the reverse direction to close the high pressure gas connection and then open the suction and the supply connections serially.

16. The combination of an evaporator having a liquid refrigerant supply connection, a suction connection and a high pressure gas connection; a valve controlling said supply connection; and valve means controlling the suction and high pressure gas connections conjointly, and movable alternately between two positions in which said connections are opened in alternation with each other.

17. In a refrigerating system, the combination of a compressor; a condenser; a high pressure receiver fed by the condenser; a low pressure receiver connected with the suction of said compressor; automatic valve means for feeding liquid refrigerant from the high pressure receiver to the low pressure receiver; an evaporator of the flooded type; a feed connection from the low pressure receiver to the flooded evaporator. a suction connection from the evaporator to said low pressure receiver and the suction side of said compressor; a hot gas connection from the compressor discharge to said evaporator; valve means adapted in one position to open said supply and suction connections and to close said hot gas connection, and in another position to close said supply and suction connections and open said hot gas connection; and automatic means serving in the last named position of the valve to limit the pressure in said evaporator.

18. In a refrigerating system, the combination of a compressor; a condenser; a high pressure receiver fed by the condenser; a low pressure receiver connected with the suction of said compressor; automatic valve means for feeding liquid refrigerant from the high pressure receiver to the low pressure receiver; an evaporator of the flooded type; a feed connection from the low pressure receiver to the flooded evaporator; a suction connection from the evaporator to said low pressure receiver and the suction side of said compressor; a hot gas connection from the compressor discharge to said evaporator; valve means adapted in one position to open said supply and suction connections and to close said hot gas connection, and in another position to close said supply and suction connections and open said hot gas connection; and a pressure reducing valve in said hot gas connection serving to control the pressure of hot gas entering said evaporator.

19. In a refrigerating system, the combination of a compressor; a condenser; a high pressure receiver bed by the condenser; a low pressure receiver connected with the suction of said compressor; automatic valve means for feeding liquid refrigerant from the high pressure receiver to the low pressure receiver; an evaporator of the flooded type, a feed connection from the low pressure receiver to the flooded evaporator; a suction connection from the evaporator to said low pressure receiver and the suction side of said compressor; a hot gas connection from the compressor discharge to said evaporator; valve means adapted in one position to open said supply and suction connections and to close said hot gas connection, and in another position to close said supply and suction connections and open said hot gas connection; and an adjustable relief valve connected with said evaporator and serving to limit the maximum pressure established therein at a pressure higher than the normal suction pressure.

20. In a refrigerating system, the combination of a compressor; a condenser; a high pressure receiver fed by the condenser; a low pressure receiver connected with the suction of said compressor; automatic valve means for feeding liquid refrigerant from the high pressure receiver to the low pressure receiver; an evaporator of the flooded type; a feed connection from the low pressure receiver to the flooded evaporator; a suction connection from the evaporator to said low pressure receiver and the suction side of said compressor; a hot gas connection from the compressor discharge to said evaporator; valve means adapted in one position to open said supply and suction connections and to close said hot gas connection, and in another position to close said supply and suction connections and open said hot gas connection; a pressure reducing valve interposed in said hot gas connection; and an adjustable relief valve on said evaporator.

In testimony whereof I have signed my name to this specification.

THOMAS SHIPLEY.